E. P. BROWN.
DENTAL DISINFECTED FLOSS SILK.

No. 185,666.          Patented Dec. 26, 1876.

WITNESSES:                 INVENTOR:

UNITED STATES PATENT OFFICE.

E. PARMLY BROWN, OF FLUSHING, NEW YORK.

IMPROVEMENT IN DENTAL DISINFECTED FLOSS-SILK.

Specification forming part of Letters Patent No. 185,666, dated December 26, 1876; application filed April 3, 1876.

*To all whom it may concern:*

Be it known that I, E. PARMLY BROWN, of Flushing, State of New York, have invented a Medicated Floss-Silk, of which the following is a specification:

The object of my invention is to produce a cheap, popular, and effective method of cleansing and disinfecting the mouth and teeth, thereby purifying the breath and preventing decay in the teeth, and especially between them, where other methods fail.

The invention consists in preparing floss-silk by treating it with the two disinfecting agents, carbolic acid (or its equivalent, creosote) and salicylic acid, or by treating it with either one of them alone.

The silk is treated by dipping it in solutions of the acids. It is then wound on flat spools, and is ready for use.

The silk is used by passing it back and forth between the teeth, thereby removing the particles of foreign matter that may have lodged there, and at the same time leaving the teeth, by the action of the agents above mentioned, in a cleansed condition, and removing the liability to decay.

The silk is wound on a flat spool, and is then put into a flat case made of leather, thus making portable and easily carried in the pocket, if desired.

Figure 1:
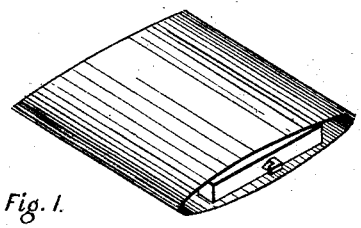
Figure 2:
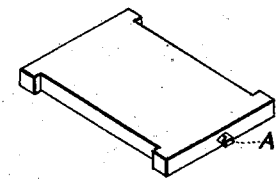

In the accompanying full-sized isometric drawing, Figure 1 shows the case containing the spool, supposed to be wound and completed. Fig. 2 shows the size and shape of the spool A, which is made of metal, serves as a handle for drawing the spool from the case, and also has a sharp edge for cutting off pieces of the silk.

I claim—

The described article of manufacture for dental disinfecting purposes, consisting of floss-silk having its fiber impregnated with a solution of salicylic and carbolic acids and creosote.

E. PARMLY BROWN.

Witnesses:
P. L. HULL,
H. E. BLAKE.